US006496760B1

(12) United States Patent
Michaelson et al.

(10) Patent No.: US 6,496,760 B1
(45) Date of Patent: Dec. 17, 2002

(54) FLIGHT INFORMATION DISPLAY WITH PLANE OF FLIGHT VIEW

(75) Inventors: Dave Michaelson, Redmond; Steven C. Johnson, Issaquah, both of WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/620,951

(22) Filed: Jul. 21, 2000

Related U.S. Application Data (60) Provisional application No. 60/144,754, filed on Jul. 21, 1999.

(51) Int. Cl.[7] ............................. G01C 21/00; G08G 5/02
(52) U.S. Cl. ............................ 701/3; 701/211; 701/215; 340/971; 340/972; 340/973; 342/29; 342/33
(58) Field of Search ............................ 701/3, 211, 213, 701/215, 300, 301; 340/974, 973, 975, 971, 972; 342/29, 33, 34

(56) References Cited

U.S. PATENT DOCUMENTS

| 5,420,582 | A | * | 5/1995 | Kubbat et al. ............... 340/974 |
| 5,798,713 | A | * | 8/1998 | Viebahn et al. .............. 340/974 |
| 5,995,903 | A | * | 11/1999 | Smith et al. ................. 701/211 |
| 6,054,937 | A | * | 4/2000 | Von Viebahn et al. ...... 340/961 |
| 6,088,634 | A | * | 7/2000 | Muller et al. .................. 701/9 |
| 6,092,009 | A | * | 7/2000 | Glover ......................... 701/14 |
| 6,138,060 | A | * | 10/2000 | Conner et al. ................. 701/9 |

* cited by examiner

*Primary Examiner*—William A. Cuchlinski, Jr.
*Assistant Examiner*—Tuan C To (57) ABSTRACT

In an aircraft flight information display system, a viewing surface of the display presents an observer with a view of the flight space forward of the aircraft. The viewing surface includes a section displaying a translucent plane of flight of the aircraft along its lateral axis having as an upper bound a line transverse to the lateral axis. The portion of the flight space upward of the plane of flight of the aircraft is displayed as a second section of the flight space above the line. Information of the features of terrain in the flight space, flight parameters of the aircraft and TCAS information is processed to form images of the terrain and traffic in relation to the translucent plane of flight of the aircraft. Terrain and traffic features are rendered in different colors according to their location with respect to the plane of flight. A series of ring-like indicia are displayed in the translucent plane to indicate the distance ranges in the plane of flight of the aircraft.

36 Claims, 7 Drawing Sheets

FLIGHT INFORMATION DISPLAY WITH PLANE OF FLIGHT VIEW

This application claims priority under 35 U.S.C. §119(e) to U.S. provisional application Serial No. 60/144,754, filed Jul. 21, 1999 that is incorporated herein by reference in its entirety.

FIELD OF THE INVENTION

This invention relates to a method and apparatus for displaying aircraft terrain and traffic information and more particularly to displaying flight information in a floating plane display from a pilot's perspective.

BACKGROUND OF THE INVENTION

As is well known, an aircraft pilot must be continuously aware of a great deal of information relevant to the flight of the aircraft. In the past, the relevant information has been displayed on a multiplicity of instruments. Such multiple instrument display has been replaced by arrangements that process all or most of the information to produce a single display in two-dimensional graphic form. Such two-dimensional graphic displays, however, have not provided a direct visual display of the dynamic relationships existing between the piloted aircraft, other air traffic and the terrain in the space of interest for flight.

U.S. Pat. No. 5,179,377 issued to William R. Hancock Jan. 12, 1993 discloses a Traffic Collision Avoidance System (TCAS) with an image format having a horizontal trend for traffic situation awareness display in an aircraft. The aircraft is represented by a center symbol and traffic is represented by position symbols that indicate by shape the horizontal heading of an aircraft. A varying size of the symbol represents the level of traffic threat or closeness in altitude differential. A different set of symbols indicates altitude and trend of altitude and another set of symbols in shape and color redundancy indicates the level of traffic threat. The arrangement disclosed in this patent, however, only indicates an external perspective isometric view of TCAS targets and target data with drop down and drop up lines for indication of relative altitude of TCAS target threat to the own aircraft.

Another display arrangement disclosed in U.S. Pat. No. 5,420,582 issued to Wolfgang Kubbat et al. May 30, 1995 provides an arrangement for displaying flight management information using a three dimensional display of flight space with at least one horizon. The predicated flight path of the aircraft is displayed as a series of symbols which assume, within the displayed flight space, the predicted position and the predicted altitude of the aircraft with respect to the flight space at different points in time. While the Kubbat et al. patent provides a view of flight space from the perspective of the aircraft, it is directed to displaying a predicted flight path with indications of various flight parameters influencing flight but does not give a clear indication of the relationship of the aircraft to the terrain and traffic in the flight space.

BRIEF SUMMARY OF THE INVENTION

The invention is directed to a flight information display system for an aircraft in which in image of the flight space forward of the aircraft is displayed on a viewing surface. According to the invention, the view on the viewing surface includes a first section of the viewing surface that represents a plane of flight of the aircraft relative to its lateral axis. A portion of the flight space upward of the aircraft flight plane is represented by a second section of the viewing surface above of the first section. Information of the terrain in the flight space and the flight parameters of the aircraft is processed to form an image on the viewing surface.

According to one aspect of the invention, the view further includes a line separating the first section representing the plane of flight of the aircraft from the second section representing the flight space upward from the plane of flight.

According to another aspect of the invention, the first section is a three dimensional translucent plane of the aircraft intersecting its lateral axis.

According to yet another aspect of the invention, ring-like indicia are displayed in the translucent plane to represent sequential distance ranges from the aircraft.

According to yet another aspect of the invention, display data generated from the terrain information is processed to form three dimensional images of terrain features of the flight space on the viewing surface.

According to yet another aspect of the invention, terrain feature images and TCAS symbols on the viewing surface that intersect the translucent plane are displayed in a first rendering. Terrain features and optionally TCAS symbols on the viewing surface in the second section within a predetermined distance downward from the translucent plane of flight are displayed in a second rendering and terrain feature images and optionally TCAS symbols in the second section on the viewing surface downward from the translucent plane of flight more than the predetermined distance are displayed in a third rendering.

According to yet another aspect of the invention, the translucent plane is truncated at an intersection of the plane with a selected terrain feature image.

In an embodiment of the invention, a computational engine receives TCAS, terrain and aircraft parameter information and generates display data that includes flight path angle, plane of flight coordinates, distance range parameters, terrain feature coordinates, TCAS targets and intersections of the plane of flight and surrounding terrain. The display data is transferred to a graphics processor that forms an integrated display of a plane of flight image, terrain feature images and TCAS target images.

DETAILED DESCRIPTION

Figure 1:
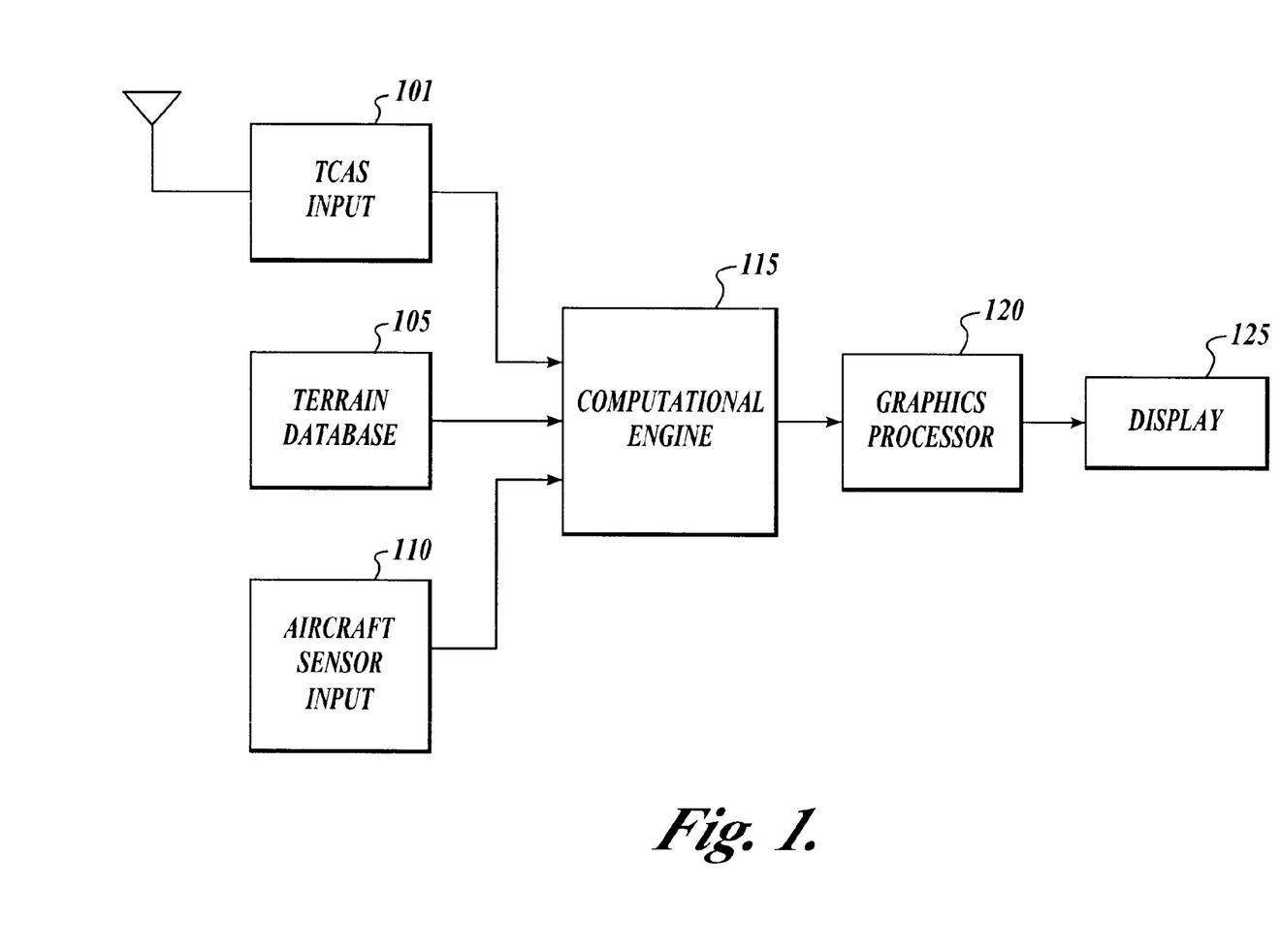
FIG. 1 depicts a general block diagram of a flight information display system illustrative of the invention.
Figure 6:
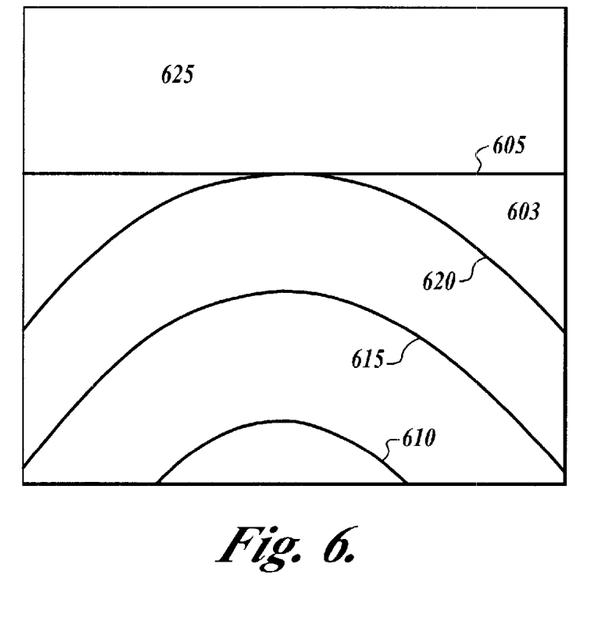
FIG. 6 shows a display of a plane of flight of an aircraft on a viewing surface according to the invention.

FIG. 1 depicts an embodiment of a flight information display system illustrative of the invention. In FIG. 1, there is shown an optional TCAS input unit 101, a terrain database unit 105, an aircraft sensor input unit 110, a computational engine 115, a graphics processor 120 and a display 125. The display 125 provides a view of a flight space including terrain features and TCAS targets as seen by an observer on the aircraft. FIG. 6 is an example of the display without terrain features or TCAS targets which illustrates the image on a viewing surface of the display 125.

Referring to FIG. 6, the viewing surface includes a three dimensional plane of flight 603 relative to the lateral axis of the aircraft and a section 625 representing the flight space upward from the plane of flight 603 of the aircraft. Sections 603 and 625 are separated by a line 605 representing a front end of the plane 603. The plane 603 is translucent and has therein a set of ring-like range indicia 610, 615 and 620 indicating distances from aircraft in the plane.

During operation of the system of FIG. 1, aircraft sensor signals including air position, altitude, attitude, navigation and heading information are supplied from the aircraft sensor input 10 to the computational engine 115 as well as terrain information from the terrain database 105. Optionally, TCAS information may also be supplied. Computational engine 115 performs the function of defining the geometry of the three dimensional plane, generating data regarding intersections with terrain features and data regarding relative altitude of TCAS targets.

Graphics data of the flight path angle, data of a two dimensional planar area for the aircraft relating to the aircraft flight path angle and the lateral axis of the aircraft, data of range rings and data of the intersection of the planar area with surrounding terrain and TCAS target information are supplied to the graphics processor 120 from the computational engine 115. The graphics processor 120 operates to translate the geometric data from the computational engine 115 into a three dimensional perspective image using generic three dimensional transformations for perspective projection processes. The graphics processor 120 generates an integrated image of the translucent plane, terrain features, intersections of the terrain features with the translucent plane 603 and the range ring indicia. The integrated image is displayed on the display 125 which display should have adequate resolution and color capabilities to support three dimensional image detail and should be certified by the FAA for cockpit use.

Figure 7:
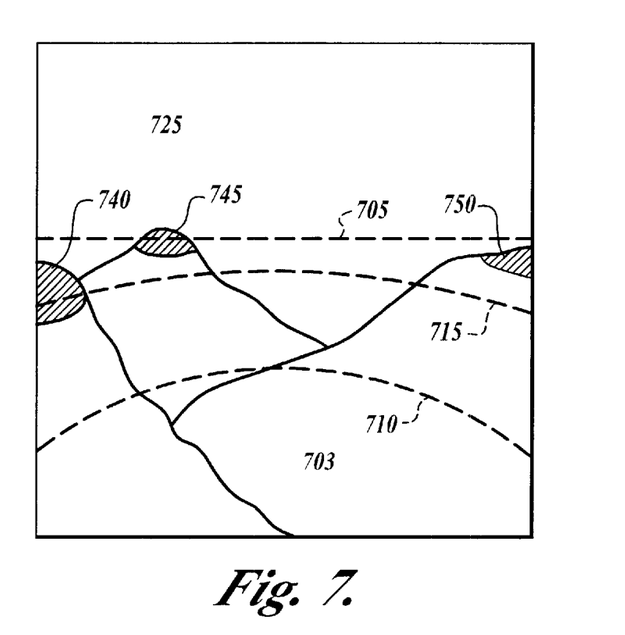
FIG. 7 shows one example of a display of the plane of flight and terrain features generated on the display unit of the flight information display system of FIG. 1.

FIG. 7 depicts an example of a display provided by the flight information display system of FIG. 1. In FIG. 7, there is shown a three-dimensional translucent plane 703 representing the plane of flight of the aircraft that is bounded by a line 705 and the bottom edge of the display, a flight space 725 above the translucent plane 703, range rings 710, 715, and terrain features 740, 745 and 750. The portion of the terrain features 740, 745 and 750 that are downward from the aircraft at least a predetermined distance (e.g., 500 ft) from the plane of flight are rendered in green. The portion of terrain features below the plane of flight but within the predetermined distance are rendered in yellow and the portion of the terrain features protruding from the plane of flight are rendered in red. Range rings 710 and 715 in the translucent plane of flight indicate the relative distance of the terrain features from the aircraft. TCAS targets (not shown) would also be positioned according to their locations in the display of FIG. 7 with renderings indicative of relative threat to the aircraft. According to the invention, the three dimensional display of FIG. 7 is formed from the viewpoint of an observer in the aircraft and provides clear situational awareness without the use of traditional navigation instrumentation having to be superimposed or overlaid on a display as in traditional synthetic vision arrangements.

Figure 8:
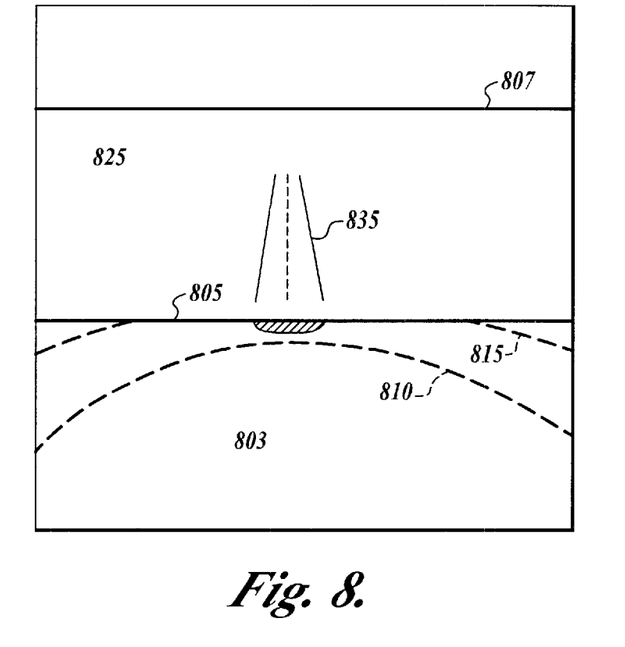
FIG. 8 shows another example of a display generated on display unit of the flight information display system of FIG. 1.

FIG. 8 shows another example of a display according to the invention in which a runway is viewed from the perspective of an observer in the aircraft with the aircraft being in a pitch-down direction with respect to the runway. Referring to FIG. 8, a translucent plane 803 is in a flight space facing a runway 835. The runway 835 is in a section 825 above the translucent plane 803. The translucent plane has range rings 810 and 815 and is directed to the ground below the runway 835 at a distance as indicated by the range ring 815. The line 807 represents the horizon of the aircraft. Since the translucent plane 803 is directed into the ground, it is truncated at the intersection of the ground and the boundary line 805 of the translucent plane of flight which is below the runway 835. In accordance with the invention, the perspective view of the plane of flight 803 relative to the lateral axis of the aircraft clearly indicates the situation wherein the aircraft is directed to a point on the ground short of the runway 835.

Figure 9:
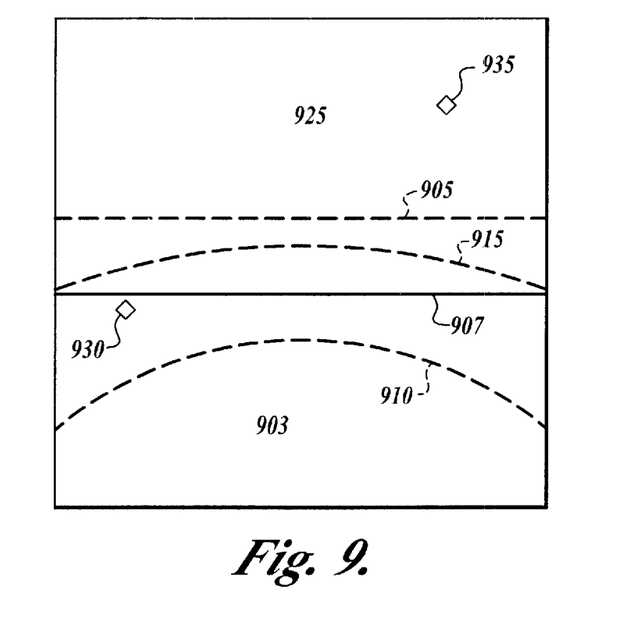
FIG. 9 shows yet another example of a display of TCAS targets generated on a display unit of the flight information display system of FIG. 1.

FIG. 9 shows a display of TCAS targets according to the invention. In FIG. 9, there is shown a three-dimensional translucent plane of flight 903 of an aircraft, a section 925 upward of the aircraft, range indicia 910 and 915, a horizon line 907, and TCAS targets 930 and 935. The target 930 is below the plane of flight and is rendered in yellow if within the predetermined distance of the aircraft and green if further away than the predetermined distance. The targets 930 and 935 in FIG. 9 are shaped and rendered in accordance with the threat that may be posed to the aircraft.

Figure 2:
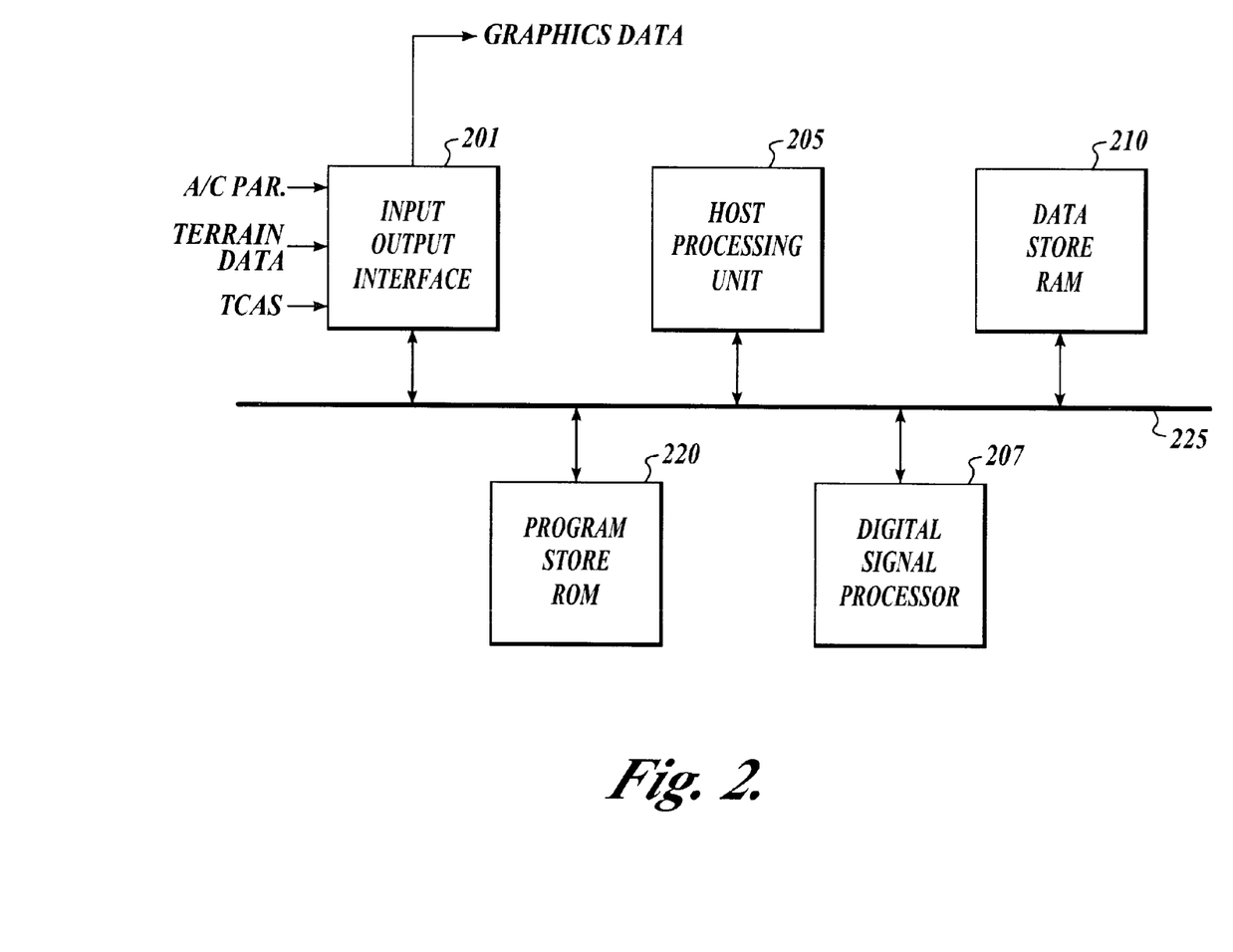
FIG. 2 depicts a block diagram of the computational engine that may be used in the flight information display system of FIG. 1.

FIG. 2 depicts a circuit arrangement that may be used as the computational engine 115 of FIG. 1. In FIG. 2, there is an input-output interface 201, a host processing unit 205, a digital signal processor 207, a data store 210, a program store 220 and a bus 225. The input-output unit 201 receives aircraft input signals from the aircraft sensor input 110, TCAS inputs from the TCAS input and terrain information from the terrain database 105 and outputs graphics data to the graphics processor 120. Host processor unit 205 controls the operation of the computational engine according to instruction codes stored in the program store 220. Digital signal processor 207 operates to process the terrain inputs, the aircraft sensor signal inputs and optionally the TCAS inputs under control of the host processor 205 to form the graphics data output for transfer to the graphics processor 120 via the input-output interface 201.

Figure 3:
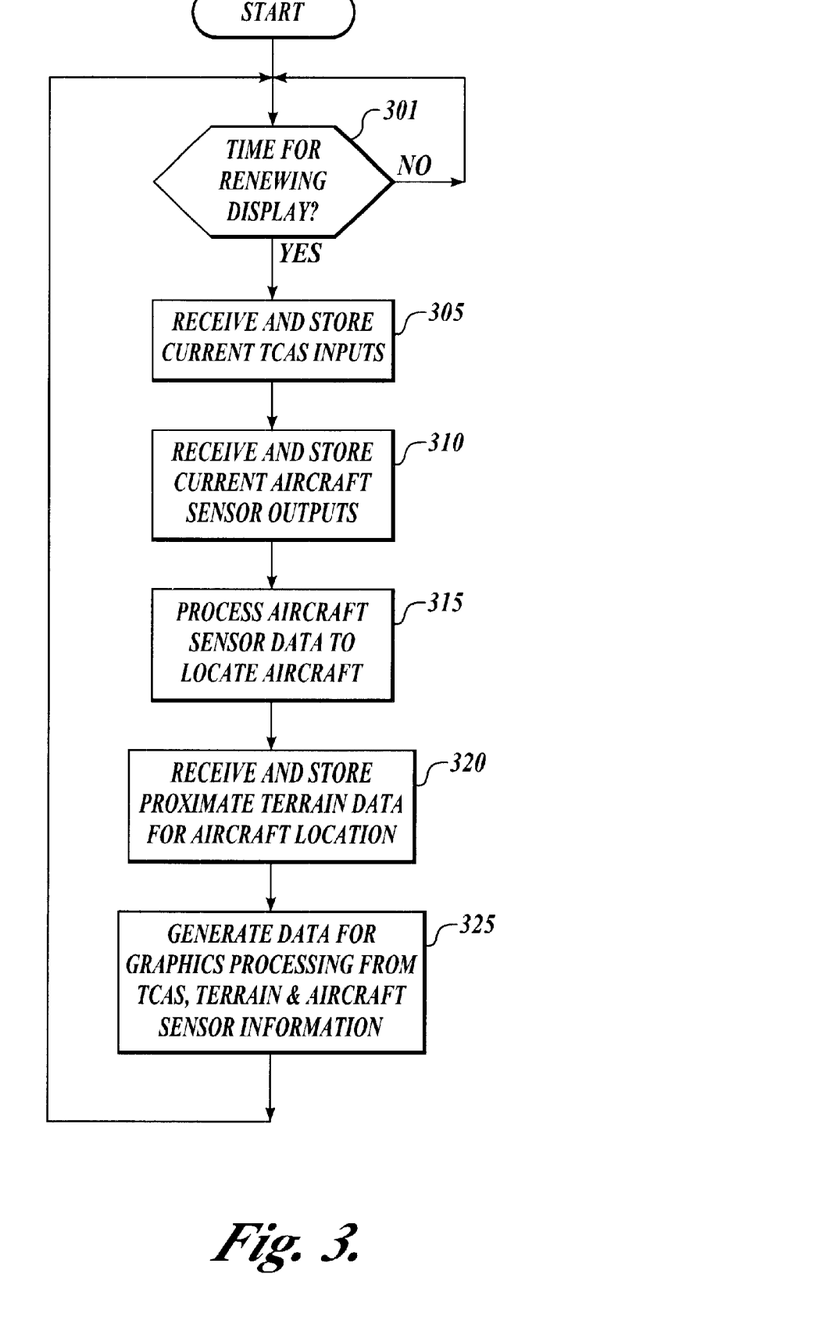
FIG. 3 is a flow chart illustrating the operation of the computational engine shown in FIG. 2.

The operations of the computational engine of FIG. 2 are performed according to the flow chart of FIG. 3 the steps of which correspond to the instruction codes stored in the program store 220. Referring to FIG. 3, the sequence from steps 305 through 325 is performed upon a yes output in step 301 which occurs periodically (e.g., at a 10 Hz rate). Step 305 is entered from the step 301 and the current TCAS inputs if available are received by the input-output interface 201 and are stored in the data store 210. In the step 310, the current aircraft sensor output signals are received and stored in the data store 210. In the steps 315 and 320, the aircraft sensor data (e.g., GPS data) is processed to provide a present aircraft location and the terrain data proximate to the aircraft is received from the terrain database and is stored in the store 210.

Step 325 is entered from the step 320 and data of the flight path angle, data of the translucent plane area, data of the intersection of the translucent plane with the surrounding terrain features and data of the TCAS targets are generated in the digital signal processor 207 for transfer to the graphics processor through the input-output unit 201. The flight path angle is computed using the arc-tangent of the quotient found by dividing the vertical speed of the aircraft by its ground speed. The coordinates for the planar area of the translucent plane of flight are then specified by the cross product of the flight path vector with the aircraft lateral axis vector.

Figure 4:
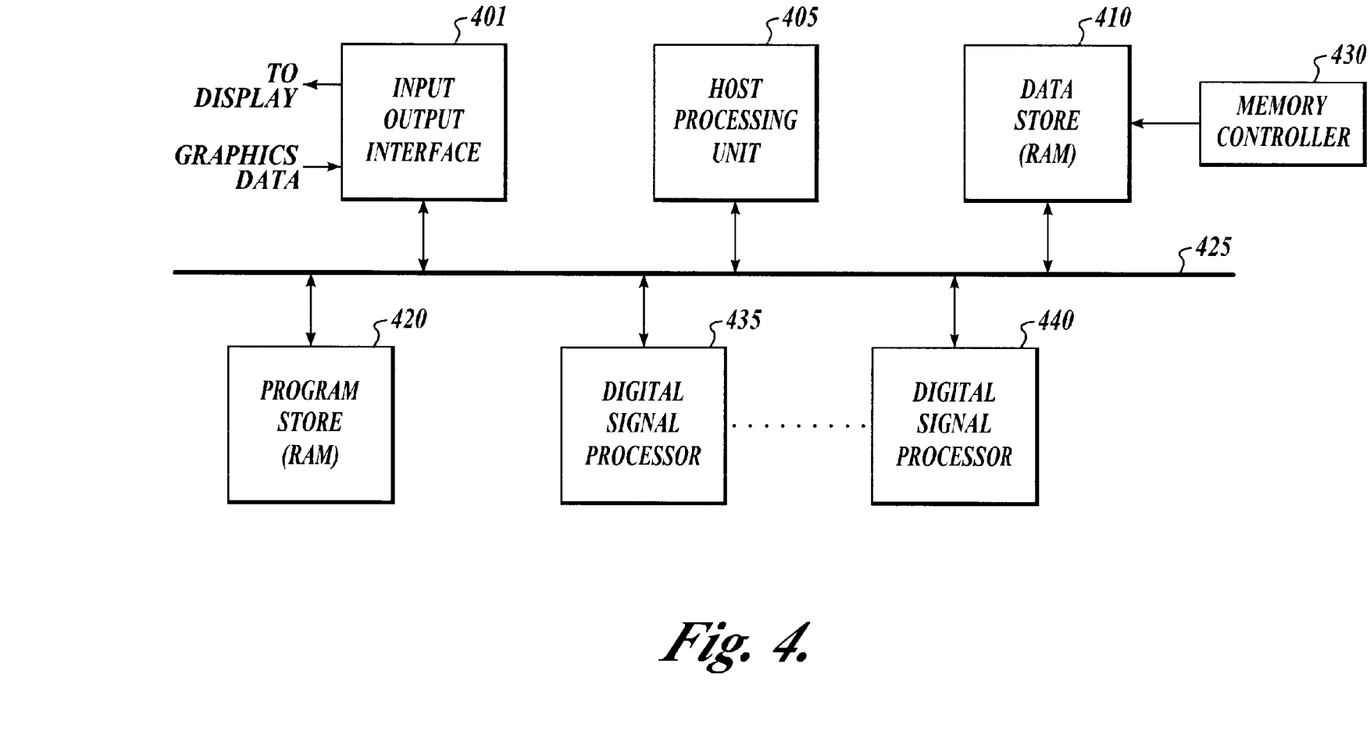
FIG. 4 is a block diagram of the graphics processor that may be used in the flight information display system of FIG. 1.

FIG. 4 shows a circuit arrangement that may be used as the graphics processor 120 in FIG. 1. The graphics processor of FIG. 4 includes an input-output interface 401, a host processing unit 405, a data store 410, a memory controller 430, a program store 420, digital signal processors 435-1 through 435-n and a bus 425. The operation of the circuit of FIG. 4 is controlled by the host processor 405 according to instructions stored in the program store 420.

Input-output interface 401 receives graphics data from the input-output interface 201 in FIG. 2, stores the received graphics data in the data store 410 and supplies image data to the display 125. The digital processors 435-1 through 435-n perform signal processing of the graphics data under control of the host processor 405 which operates according to instruction codes stored in the program store 420. Data for the digital processor operations is provided by the data store 410 under control of memory controller 430. A bus controller not shown may also be used to distribute processing among the digital processors 435-1 through 435-n.

Figure 5:
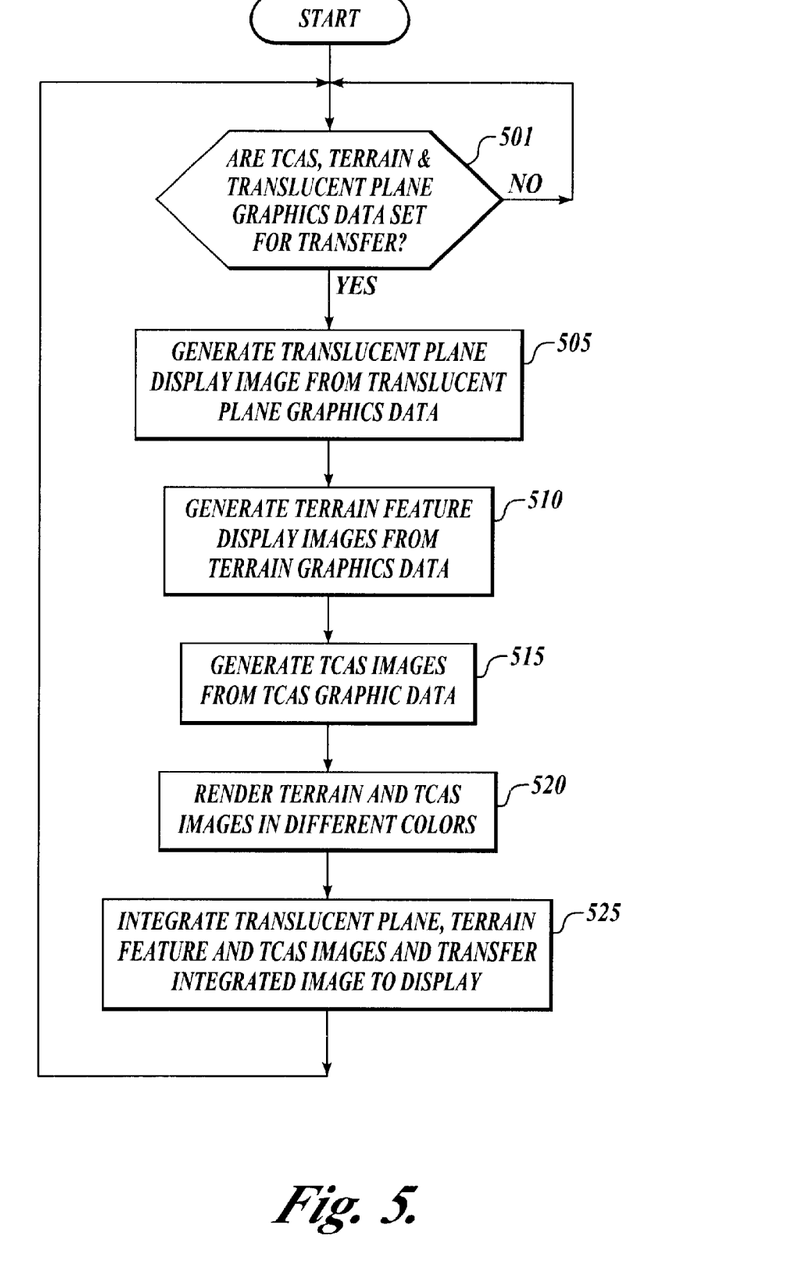
FIG. 5 is a flow chart illustrating the operation of the graphics processor shown in FIG. 4.

FIG. 5 is a flow chart that illustrates the operation of the circuit of FIG. 4 according to the instruction codes stored in the program store 420. In step 501 of FIG. 5, it is determined if the TCAS, terrain and translucent plane graphics data is set for transfer from the computational engine 115. If yes, step 505 is entered and the translucent plane display image is generated from the translucent plane graphics data. The terrain feature images are then generated relative to the translucent plane image according to the terrain feature graphics data in step 510. TCAS target images are formed in relation to the translucent plane image in step 515 and the terrain and TCAS target images are rendered in different colors according to their positions in the image to be displayed. The generated images are then integrated and sent to the display 125 in step 525. Control is then passed to the step 501 to await the next set of graphics data from the computational engine 115.

While the invention has been described in conjunction with a specific embodiment, it is evident to those skilled in the art that many further alternatives, modifications and variations will be apparent in light of the foregoing description. Moreover, it is contemplated that the present invention is not limited to the particular circuit arrangement described and may utilize other appropriate operational amplifier and feedback arrangements. Thus, the invention described herein is intended to embrace all such alternatives, modifications, applications and variations as may fall within the spirit and scope of the appended claims.

What is claimed is:

1. A flight information display system for an aircraft comprising:

display means having a viewing surface presenting to an observer a three dimensional view of a flight space forward of the aircraft, the view on the viewing surface including a first section representing a plane of flight of the aircraft relative to its lateral axis and a second section above the first section representing a portion of the flight space upward from the plane of flight;

means for receiving information of a terrain in the flight space;

means for receiving information of flight parameters of the aircraft;

means for processing the received terrain information and the flight parameter information to form display data; and means responsive to the display data for generating an image on the viewing surface.

2. A flight information display system for an aircraft according to claim 1, wherein the view further comprises a line separating the first section representing the flight plane of the aircraft from the second section representing the flight space upward from the aircraft.

3. A flight information display system for an aircraft according to claim 2, wherein the first section is a three dimensional translucent plane of flight of the aircraft relative to its lateral axis that includes ring-like indicia representing sequential distance ranges from the aircraft.

4. A flight information display system for an aircraft according to claim 1, wherein display data generated from the terrain information is processed to form three dimensional images of terrain features of the flight space on the viewing surface.

5. A flight information display system for an aircraft according to claim 4, wherein terrain feature images on the viewing surface protruding upward through the translucent plane are displayed in a first rendering, terrain feature images on the viewing surface in the first section that are downward from the plane of flight within a predetermined distance are displayed in a second rendering and terrain features that are downward from the plane of flight at greater than the predetermined distance are displayed in a third rendering.

6. A flight information display system for an aircraft according to claim 4, wherein the translucent plane is terminated at an intersection of the translucent plane with a terrain feature image.

7. A flight information display system for an aircraft according to claim 1, wherein the means for processing the received terrain information and the flight parameter information includes a first processor means for generating signals representative of the plane of flight of the aircraft, distance indicating indicia in the plane of flight and intersections of the plane of flight with the terrain features.

8. A flight information display system for an aircraft according to claim 7, wherein the means responsive to the display data for generating an image on the viewing surface includes second processor means responsive to the signals representative of the plane of flight of the aircraft, distance indicating indicia in the plane of flight and intersections of the plane of flight with the terrain features for generating an integrated image including an image of the plane of flight of the aircraft in relation to the images of the terrain features.

9. A flight information display system for an aircraft according to claim 7, wherein the first processor means further includes means for generating coordinates of the plane of flight of the aircraft relative to the lateral axis by computing a flight path angle vector of the aircraft using an arc-tangent of the ratio of vertical speed of the aircraft to ground speed of the aircraft and forming coordinate signals from the cross product of the flight path vector with a lateral axis vector of the aircraft.

10. A method of displaying flight information of an aircraft comprising:

forming a viewing surface presenting to an observer a three dimensional view of a flight space forward of the aircraft in which a first section is displayed that represents a plane of flight of the aircraft relative to its lateral axis and a second section is displayed that represents a portion of the flight space upward from the plane;

receiving information of a terrain in the flight space;

receiving information of flight parameters of the aircraft; and processing the received terrain information and received flight parameter information to form display data; and generating an image on the viewing surface responsive to the display data.

11. A method of flight information display of an aircraft according to claim 10, wherein the view displayed further includes a line separating the first section representing the flight plane of the aircraft from the second section representing the flight space upward from the plane.

12. A method of flight information display of an aircraft according to claim 10, wherein the plane of flight is a three dimensional translucent plane relative to the lateral axis of the aircraft that includes ring-like indicia representing ranges of distance from the aircraft.

13. A method of flight information display of an aircraft according to claim 10, wherein display data generated from the terrain information is processed to form three-dimensional images of terrain features of the flight space on the viewing surface.

14. A method of flight information display of an aircraft according to claim 13, wherein terrain feature images on the viewing surface protruding through the translucent flight plane of the aircraft are displayed in a first rendering, terrain feature images on the viewing surface in the first section that are within a predetermined distance below the plane of flight are displayed in a second rendering and terrain feature images that are at greater than the predetermined distance below the plane of flight are displayed in a third rendering.

15. A method of flight information display of an aircraft according to claim 14, wherein the translucent plane is terminated at an intersection of the translucent plane with a selected terrain feature image.

16. A method of flight information display of an aircraft according to claim 10, wherein the processing of the received terrain information and the flight parameter information includes generating signals representative of the plane of flight of the aircraft, distance indicating indicia in the plane of flight and intersections of the plane of flight with the terrain features.

17. A method of flight information display of an aircraft according to claim 16, wherein generating an image on the viewing surface responsive to the display data includes generating an integrated image-including an image of the plane of flight of the aircraft in relation to the images of the terrain features responsive to the signals representative of the plane of flight of the aircraft, distance indicating indicia in the plane of flight and intersections of the plane of flight with the terrain features.

18. A method of flight information display of an aircraft according to claim 16, wherein the processing of the received terrain information and the flight parameter information further includes generating coordinates of the plane of flight of the aircraft relative to the lateral axis by computing a flight path angle vector of the aircraft using an arc-tangent of the ratio of vertical speed of the aircraft to ground speed of the aircraft and forming coordinate signals from the cross product of the flight path vector with a lateral axis vector of the aircraft.

19. In a flight information display system for an aircraft, a computer usable medium having computer readable program code units embodied therein comprising:

a first program code unit for forming a viewing surface presenting to an observer a three-dimensional view of a flight space forward of an aircraft with a first viewing section representing a plane of flight of the aircraft relative to its lateral axis and a second viewing section representing a portion of the flight space upward from the plane of flight;

a second program code unit for receiving information of a terrain in the flight space;

a third program code unit for receiving flight parameters of the aircraft;

a fourth program code unit for processing the received terrain information and the received flight parameter information to form display data; and a fifth program code unit for generating an image on the viewing surface responsive to the display data.

20. In a flight information display system for an aircraft, a computer usable medium having computer readable program code units embodied therein according to claim 19, wherein the first program code unit further includes a programming unit for forming a viewing line separating the first section representing the flight plane of the aircraft from the second section representing the flight space upward from the plane.

21. In a flight information display system for an aircraft, a computer usable medium having computer readable program code units embodied therein according to claim 19, wherein the first program code unit includes a programming unit forming the plane of flight as a three dimensional translucent plane relative to the lateral axis of the aircraft that includes ring-like indicia representing ranges of distance from the aircraft.

22. In a flight information display system for an aircraft, a computer usable medium having computer readable program code units embodied therein according to claim 19, wherein the fifth program code unit includes a program code unit for forming three-dimensional images of terrain features of the flight space on the viewing surface from the display data.

23. In a flight information display system for an aircraft, a computer usable medium having computer readable program code units embodied therein according to claim 22, wherein the fifth program code unit includes a program code unit for displaying terrain feature images on the viewing surface that protrude through the translucent plane of flight of the aircraft in a first rendering, for displaying terrain feature images in the first viewing section that are downward from the plane of flight within a predetermined distance in a second rendering and for displaying terrain feature images in the first viewing section that are downward from the plane of flight at greater than the predetermined distance in a third rendering.

24. In a flight information display system for an aircraft, a computer usable medium having computer readable program code units embodied therein according to claim 23, wherein the fifth program unit includes a program unit for terminating the translucent plane of flight of the aircraft at an intersection of the translucent plane with a selected terrain feature image.

25. In a flight information display system for an aircraft, a computer usable medium having computer readable program code units embodied therein according to claim 19, wherein the fourth program code unit includes a program code unit for processing the received terrain information and the flight parameter information to generate signals representative of the plane of flight of the aircraft, distance indicating indicia in the plane of flight and intersections of the plane of flight with the terrain features.

26. In a flight information display system for an aircraft, a computer usable medium having computer readable program code units embodied therein according to claim 25, wherein the fifth program code unit includes a program code unit for generating an integrated image including an image of the plane of flight of the aircraft in relation to the images of the terrain features responsive to the signals representative of the plane of flight of the aircraft, distance indicating indicia in the plane of flight and intersections of the plane of flight with the terrain features.

27. In a flight information display system for an aircraft, a computer usable medium having computer readable program code units embodied therein according to claim 25, wherein the fourth program code unit includes a program code unit for generating coordinates of the plane of flight of the aircraft relative to the lateral axis by determining a flight path angle vector of the aircraft using an arc-tangent of the ratio of vertical speed of the aircraft to ground speed of the aircraft and forming coordinate signals from the cross product of the flight path vector with a lateral axis vector of the aircraft.

28. A flight information display system for an aircraft comprising:

a display unit including a viewing surface presenting to an observer a three dimensional view of a flight space forward of the aircraft, the view on the viewing surface including a first section representing a plane of flight of the aircraft relative to its lateral axis and a second section above the first section representing a portion of the flight space upward from the plane of flight;

a receiver for receiving information of a terrain in the flight space;

a receiver for receiving information of flight parameters of the aircraft;

a first processor for processing the received terrain information and the flight parameter information to form display data; and a second processor responsive to the display data for generating an image on the viewing surface.

29. A flight information display system for an aircraft according to claim 28, wherein the viewing surface further comprises a line separating the first section representing the flight plane of the aircraft from the second section representing the flight space upward from the aircraft.

30. A flight information display system for an aircraft according to claim 28, wherein the first section is a three dimensional translucent plane of flight of the aircraft relative to its lateral axis that includes ring-like indicia representing sequential distance ranges from the aircraft.

31. A flight information display system for an aircraft according to claim 30, wherein display data generated from the terrain information is processed to form three dimensional images of terrain features of the flight space on the viewing surface.

32. A flight information display system for an aircraft according to claim 31, wherein terrain feature images on the viewing surface protruding upward through the translucent plane are displayed in a first rendering, terrain feature images on the viewing surface in the first section that are downward from the plane of flight within a predetermined distance are displayed in a second rendering and terrain features that are downward from the plane of flight at greater than the predetermined distance are displayed in a third rendering.

33. A flight information display system for an aircraft according to claim 30, wherein the translucent plane is terminated at an intersection of the translucent plane with a terrain feature image.

34. A flight information display system for an aircraft according to claim 28, wherein the first processor for processing the received terrain information and the flight parameter information includes a processor for generating signals representative of the plane of flight of the aircraft, distance indicating indicia in the plane of flight and intersections of the plane of flight with the terrain features.

35. A flight information display system for an aircraft according to claim 28, wherein the second processor for processing the received terrain information and the flight parameter information further includes a processing unit responsive to the signals representative of the plane of flight of the aircraft, distance indicating indicia in the plane of flight and intersections of the plane of flight with the terrain features for generating an integrated image including an image of the plane of flight of the aircraft in relation to the images of the terrain features.

36. A flight information display system for an aircraft according to claim 34, wherein the first processor further includes a processing unit for generating coordinates of the plane of flight of the aircraft relative to the lateral axis by computing a flight path angle vector of the aircraft using an arc-tangent of the ratio of vertical speed of the aircraft to ground speed of the aircraft and forming coordinate signals from the cross product of the flight path vector with a lateral axis vector of the aircraft.

* * * * *